United States Patent
Benstetter et al.

(10) Patent No.: US 7,788,732 B2
(45) Date of Patent: Aug. 31, 2010

(54) METHOD AND APPARATUS FOR TWO-DIMENSIONAL PROFILING OF DOPING PROFILES OF A MATERIAL SAMPLE WITH SCANNING CAPACITANCE MICROSCOPE

(75) Inventors: Guenther Benstetter, Deggendorf (DE); Peter Breitschopf, Thyrnau (DE); Bernard Theo Knoll, Neubiberg (DE)

(73) Assignee: Infineon Technologies AG, Munich (DE)

(*) Notice: Subject to any disclaimer, the term of this patent is extended or adjusted under 35 U.S.C. 154(b) by 280 days.

(21) Appl. No.: 11/726,590

(22) Filed: Mar. 22, 2007

(65) Prior Publication Data

US 2007/0221841 A1  Sep. 27, 2007

(30) Foreign Application Priority Data

Mar. 22, 2006  (DE) ....................... 10 2006 013 588

(51) Int. Cl.
*G01Q 60/46* (2010.01)
(52) U.S. Cl. .................... 850/44; 250/306; 250/307
(58) Field of Classification Search ........... 250/306, 250/307; 324/762, 519, 522; 977/849, 866; 73/105
See application file for complete search history.

(56) References Cited

U.S. PATENT DOCUMENTS

| | | | | |
|---|---|---|---|---|
| 5,065,103 | A * | 11/1991 | Slinkman et al. | 324/458 |
| 5,369,370 | A | 11/1994 | Stratmann et al. | 324/663 |
| 5,523,700 | A * | 6/1996 | Williams et al. | 324/765 |
| 5,742,172 | A * | 4/1998 | Yasutake | 324/754 |
| 6,172,506 | B1 * | 1/2001 | Adderton et al. | 324/458 |
| 6,185,991 | B1 * | 2/2001 | Hong et al. | 73/105 |
| 6,211,686 | B1 * | 4/2001 | Matsuzawa et al. | 324/719 |
| 6,545,495 | B2 * | 4/2003 | Warmack et al. | 324/762 |
| 6,836,139 | B2 * | 12/2004 | Howland | 324/766 |
| 6,856,145 | B2 * | 2/2005 | Pelz et al. | 324/663 |
| 6,975,129 | B2 * | 12/2005 | Chang | 324/762 |

(Continued)

FOREIGN PATENT DOCUMENTS

DE    40 18 993    12/1991

(Continued)

OTHER PUBLICATIONS

Breitschopf, et al ("Intermittent contact scanning capacitance microscopy—an improved method for 2D doping profiling" Microelectronics Reliability 45 (2005) 1568-1571).*

(Continued)

*Primary Examiner*—Robert Kim
*Assistant Examiner*—Michael Maskell
(74) *Attorney, Agent, or Firm*—Davidson, Davidson & Kappel, LLC

(57) ABSTRACT

A method and an apparatus is disclosed for two-dimensional profiling of doping profiles of a material sample with scanning capacitance microscope. A scanning of a two-dimensional structure of a dielectric or partially dielectric material sample with a tip of a probe of the scanning microscope is carried out. The change in capacitance during the scanning motion of the probe from one position on the material sample to the next is measured. Finally, an evaluation of the change in capacitance during the scanning motion of the probe from one position on the material sample to the next as a current is carried out.

19 Claims, 2 Drawing Sheets

U.S. PATENT DOCUMENTS

| | | | |
|---|---|---|---|
| 2002/0043101 A1* | 4/2002 | Naitou et al. | 73/105 |
| 2005/0077915 A1* | 4/2005 | Pelz et al. | 324/762 |
| 2007/0012093 A1* | 1/2007 | Kwon et al. | 73/105 |
| 2008/0098805 A1* | 5/2008 | Jin et al. | 73/105 |

FOREIGN PATENT DOCUMENTS

WO     WO 03/033993     4/2003

OTHER PUBLICATIONS

K. Goto, K. Hare: "Tapping Mode scanning capacitance microscopy: Feasibility of quantitative capacitance measurement," SPIE vol. 3009, 84-91 (1997), 8 pages.

R. Garcia et al.: "Dynamic Atomic Force Microscopy Methods," Surface Science Reports 47 (2002), 197-301.

Peter Breitschopf et al.: "An improved method for 2D doping profiling," Microelectronics Reliability 45 (2005), 1568-1571.

G. Wurtz et al.: "Imaging a GaAlAs laser diode in operation using apertureless scanning near-field optical microscopy," The European Physical Journal—Applied Physics 5 (1999), 849-854.

B. Knoll et al.:"Enhanced dielectric contrast in scattering-type scanning near-field optical microscopy," Optics Communications 182 (2000), 321-328.

R. Blum et al.: "Analyzing the polarization distribution in poled polymer films by scanning Kelvin microscopy", Appl. Phys. Lett. (2000), 604-606.

D.T. Lee et al.:"Instrumentation of direct, low frequency scanning capacitance microscopy, and analysis of position dependent stray capacitance", Rev. Sci. Instrum. 73, (Oct. 2002), pp. 3525-3533.

* cited by examiner

METHOD AND APPARATUS FOR TWO-DIMENSIONAL PROFILING OF DOPING PROFILES OF A MATERIAL SAMPLE WITH SCANNING CAPACITANCE MICROSCOPE

This claims the benefit of German Patent Application No. 10 2006 013 588.1, filed on Mar. 22, 2006 and hereby incorporated by reference herein.

The present invention relates to a method for scanning the surface capacitance of a two-dimensional structure of a material sample using a tip of a scanning microscope. Additionally the invention relates to am apparatus for scanning the surface capacitance of a two-dimensional structure of a material sample.

BACKGROUND

It is possible to detect free charge carriers in solids using scanning capacitance microscopy technology (SCM). Free charge carriers are found e.g. in metals. But doped silicon, as is used in the entire semiconductor industry, also contains free charge carriers (of a type different than in metals). It is thus also possible to use this property to analyze electronic components, which e.g. include dielectric layers.

With the increasing miniaturization of structures in integrated circuits, the tolerances for the fabrication of doped areas are becoming smaller and smaller. In addition to the spreading-resistance method, SCM measurement of structures represents a simple possibility for quantitatively investigating doped zones.

In this process, an electrically conductive measuring tip scans the surface of the component or substrate and registers the capacitance between the tip and the sample as a function of the location, so that capacitance changes in the underlying substrate of the component can be detected. A silica layer serves to isolate the substrate, and simultaneously functions as a dielectric.

The functionality of such SCM technology is only assured when the tip of the probe is in constant contact with the material sample to be scanned. The forces acting laterally on the tip produce noticeable tip wear of the probe during the scanning process. Additionally, the constant contact of the tip with the sample also exerts forces on the sample that can damage it. For the same reason, it is not possible to test elastic samples with this method.

A scanning method has previously been described in K. Goto, K. Hare, Tapping Mode scanning capacitance microscopy, SPIE Vol. 3009, 84 (1997) and in K. Goto, K. Hare Tapping Mode scanning capacitance microscopy, Rev. Sci. Instrum. 68 (1), January 1997 in which the probe oscillates above the surface of the sample and touches it only briefly (tapping mode). In this tapping mode, the tip of the probe is periodically brought into contact with the substrate so as to exert a force on the atomic scale (thus also the name IC-AFM=intermittent contact atomic force microscopy) and excited with a frequency which is close to the resonance frequency of the probe, as has also been described e.g. in R. Garcia, Dynamic Atomic Force Microscopy Methods, Surface Science Reports 47 (2002), 197-301.

Interactions between the surface of the sample and the tip cause the amplitude of the tip motion to change. Using a control loop a signal is generated which varies the distance between the tip and the sample such that the amplitude of the tip motion remains constant. This signal is a measure of the topography of the sample surface. As a consequence, the tip periodically touches the surface and only briefly each time. As the lateral scanning speed is much slower than the vertical tip speed, the lateral forces between the tip and the sample are practically negligible.

The structure to be measured essentially includes a system of two capacitances connected in series. A part of the total capacitance is formed by the substrate capacitance and the overlying silica. The remaining portion of the capacitance consists of the tip and the air between the tip and the substrate as a dielectric. Whereas the capacitance of the substrate together with that of the silica represents a portion that varies only with the sample properties (such as the doping), the value of the capacitance formed by the tip and the air is approximately reciprocal to the distance between the tip and the surface of the silica. As the conductive tip in turn is connected to a capacitance sensor, an amplitude-modulated signal is generated at the sensor output whose frequency is equal to the resonance frequency of the tip and whose degree of modulation changes with the substrate capacitance.

The advantage of this method is that lateral forces on the probe tip are substantially reduced and the probe tip wear is thus minimized. The mechanical advantage arising from the dynamic embodiment, however, is offset by significant disadvantages with respect to the SCM signal. For one thing, non-local couplings e.g. between the tip holder and the sample also contribute to the modulated signal, and for another the dynamics of the measurement signal are weakened by crosstalk on the oscillator signal driving the probe. The resolution of dynamic SCM thus remains much lower than the topographic resolution of the component or the substrate.

A further development has been described in the monograph "Intermittent contact scanning capacitance microscopy—An improved method for 2D doping profiling" by P. Breitschopf, G. Benstetter, B. Knoll, W. Frammelsberger, published in the periodical Microelectronics Reliability 45 (2005), 1568-1571. This method is based on the fact that, due to the harmonic mechanical tip motion and the non-linear distance-dependency of the SCM signal, higher-order spectral components are generated. The higher-order signal relevant for the measurement is detected by means of a two-phase lock-in amplifier. The tapping signal represents the reference frequency, which, before being used with (or in) the lock-in amplifier, must be multiplied by a factor of between 2 and 4 or higher to minimize primarily harmonic signal components of non-local coupling e.g. between the tip holder and sample, on the one hand, and the background interference due to feedover of the tapping signal on the other. This complex has been described in G. Wurtz, R. Bachelot, P. Royer, Imaging a GaAlAs laser diode in operation using apertureless scanning near-field optical microscopy, The European Physical Journal—Applied Physics 5 (1999) 849-854 and in B. Knoll, F. Keilmann, Enhanced dielectric contrast in scattering-type scanning near-field optical microscopy, Optics Communications 182 (2000) 321-328.

All previously known variants of scanning capacitance microscopy use a UHF (ultra high frequency) capacitance sensor for the actual capacitance measurement. This includes a UHF resonant circuit and must be tuned to match the respective ambient conditions before each measurement. However, in this process it is not possible to rule out an interaction with the environment, particularly under variable ambient conditions. Additionally, scanning probe microscopes are not normally equipped with UHF capacitor sensors. These must be retrofitted in the form of expensive capacitance modules and adapted to the existing evaluation electronics.

SUMMARY OF THE INVENTION

An object of the present invention is to come up with a method which does not require retrofitting in the form of expensive capacitance modules or adaptation to the existing evaluation electronics.

The present invention provides a method for two-dimensional profiling of doping profiles of a material sample with scanning capacitance microscope. A scanning of a two-dimensional structure of a dielectric or partially dielectric material sample with a tip of a probe of the scanning microscope is carried out. The change in capacitance during the scanning motion of the probe from one position on the material sample to the next is measured. Finally, an evaluation of the change in capacitance during the scanning motion of the probe from one position on the material sample to the next as a current is carried out.

Another alternate or additional object of the invention is to provide an apparatus, which need not be retrofitted in the form of expensive capacitance modules or adapted to the existing evaluation electronics.

The present invention also provides an apparatus for two-dimensional profiling of doping profiles of a material sample. The apparatus including a scanning capacitance microscope having a tip of a probe for scanning a two-dimensional structure of a dielectric or partially dielectric material sample; a current amplifier, which is configured as an operational amplifier, for evaluating the change in capacitance during the scanning motion of the probe from one position on the material sample to the next as a current; and at least one lock-in amplifier, for evaluating voltage drops between the output of the operational amplifier and a reference potential.

In accordance with the present invention the prior art disadvantages can be overcome by measuring and evaluating the change in capacitance during the scanning motion of the probe along the surface of the sample using the current. The present invention is based on the fact that the capacitance conditions vary during the measurement and that as a result of the vertical tapping motion of the tip and the associated shift of the probe tip with respect to the substrate both periodically and laterally (i.e. during scanning) causes a changing shift current, which can be measured.

The following applies for the shift current I occurring at a tapping capacitance $C_{tapping}$:

$$I = dQ/dt \quad (1)$$

As $Q = C_{tapping} * U$ (voltage), application of the product rule results in:

$$I = d(C_{tapping} * U)/dt = U * dC_{tapping}/dt + C_{tapping} * dU/dt \quad (2)$$

However, when U is a fixed bias voltage $U_{Bias}$ at the tip of the probe, the second term of equation (2) becomes zero, and it follows that:

$$I = U_{Bias} * dC_{tapping}/dt \quad (3).$$

Thus, in a first embodiment, a fixed bias voltage $U_{Bias}$ may be selected between the tip and the sample. The shift current can thus be determined advantageously through a technical device.

In a further advantageous embodiment of the present method, the current may be amplified using a current amplifier, in particular using an operational amplifier.

It is also advantageous when the operational amplifier is used as a current-voltage converter and the scanning capacitance is measured as a derivative element.

In one particularly advantageous embodiment of the present invention, the shift current converted into a voltage signal using an operational amplifier may be evaluated using at least one lock-in amplifier.

Higher harmonics of the shift current converted to a voltage signal may be evaluated separately using individual lock-in amplifiers in an advantageous manner.

In a further advantageous embodiment, the shift current converted to a voltage signal may be evaluated using a lock-in amplifier (multiplexing) with respective different harmonics of the fundamental frequency as the reference signal in a fixed time sequence.

In accordance with a further advantageous embodiment of the method in accordance with the present invention, shift currents may be measured and converted to voltage signals when a corresponding oxide has previously been applied to the tips.

This enables further possibilities for the analysis of structures to which the deposition of a high quality oxide appears difficult.

Advantageous further developments of the present invention may be derived from the claims, description and the drawings.

Through the omission of an SCM sensor that operates on the basis of a resonant circuit, tuning prior to measuring to optimize the measuring results (where a UHF resonant circuit must be tuned to maximum sensitivity) is no longer necessary. This makes measurement more independent of ambient conditions.

Advantageously, only the actual capacitance changes cause a significant shift current. Additionally, the scanning probe microscope does not require an additional capacitance module, which represents a substantial cost saving.

BRIEF DESCRIPTION OF THE DRAWINGS

In the following the invention is explained in more detail on the basis of a preferred embodiment of the invention with reference to the drawings. In the drawings like reference numerals represent identical parts and some explanations are thus not repeated. In principle, the present embodiment is intended to illustrate the invention and must not in any case be interpreted as having a limiting effect.

DETAILED DESCRIPTION

Figure 1:
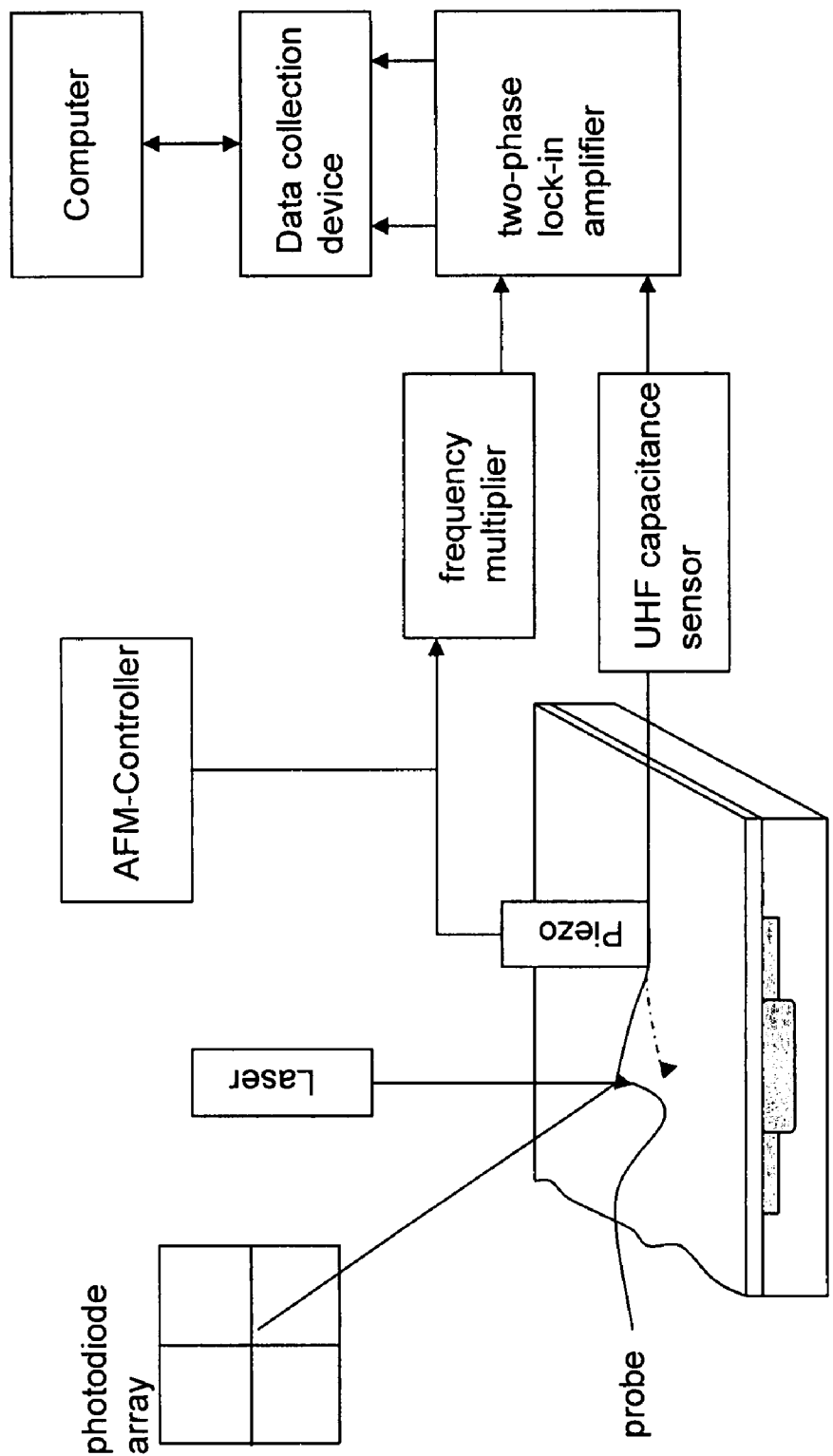
FIG. 1 is a schematic representation of an experiment configuration according to the prior art for measuring the capacitance over the surface area of a substrate to determine two-dimensional doping profiles.

The block circuit diagram of FIG. 1 initially shows the setup for a dynamically operated scanning capacitance microscope as is previously known from the prior art. In this configuration the tip is excited to vertical oscillations (e.g. 40 kHz) using a driver piezo element. The deflection is measured using the deflection of a laser focused on the rear side of the tip using a photodiode array. The controller uses this signal to control the distance between the tip and the sample and simultaneously effects the scanning in the horizontal directions. In accordance with the prior the art the tip is connected to a UHF capacitance sensor, whose detuning represents a measure for the measuring capacitance. The signal is evaluated using two-phase lock-in amplifiers, which receive as their reference signal frequency-multiples of the piezo driver signal. This enables higher spectral components of the capacitance signal and its fundamental frequency to be measured and displayed as an image using a data acquisition device and a computer.

Figure 2:
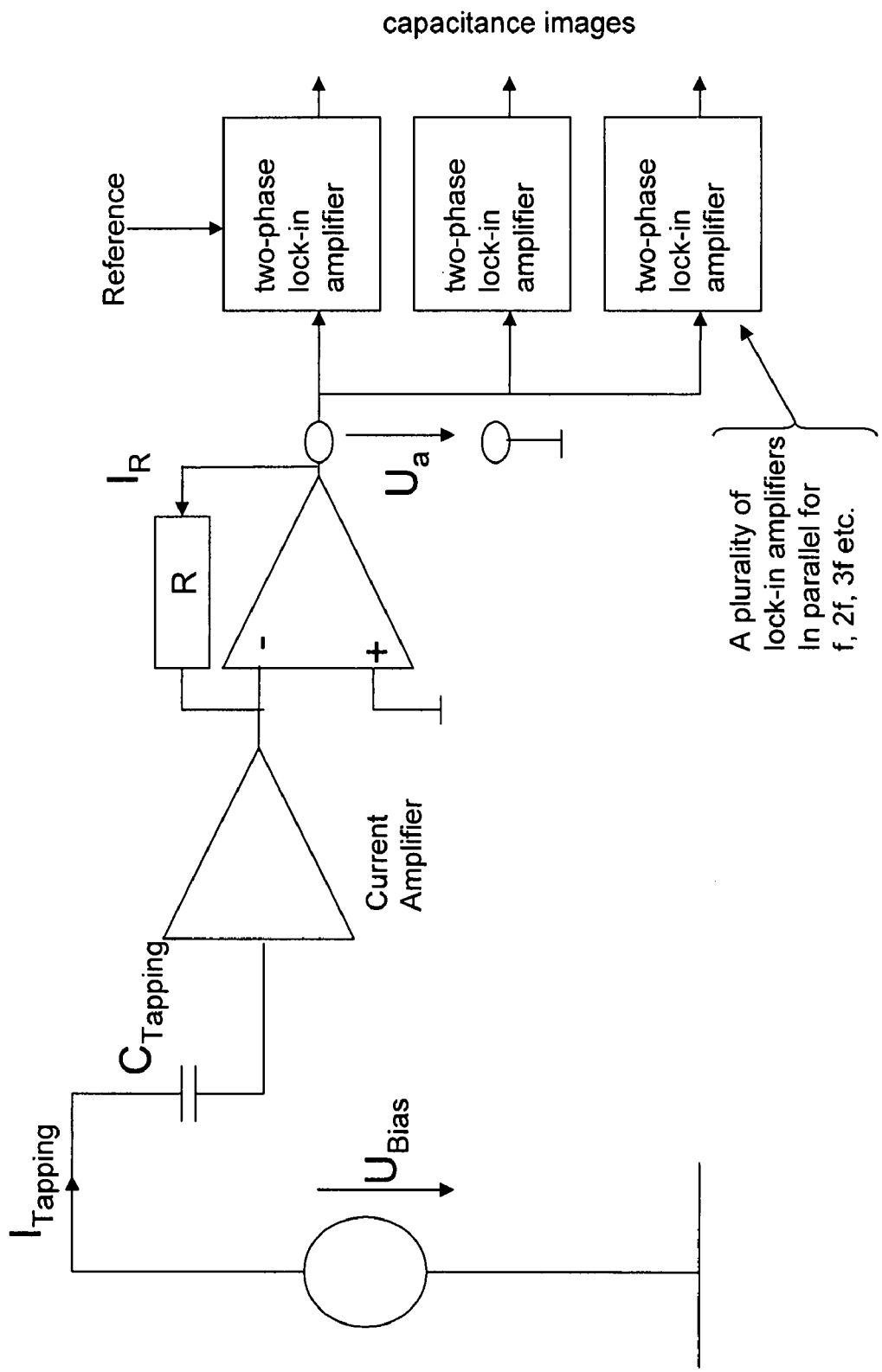
FIG. 2 schematically shows the equivalent circuit diagram of the present invention for measuring the capacitance using scanning capacitance microscopy.

The schematic block circuit diagram of FIG. 2 shows an embodiment of the measuring method according to the present invention. Here, the UHF sensor described above is eliminated, the capacitance measurement circuit is instead realized as a differentiator with the tapping capacitance as the derivative element; the operational amplifier is configured as a current-voltage converter. The current is compensated with the changing tapping capacitance using the voltage $U_A$ at the output of the operational amplifier in accordance with equation (3) ($I_{Tapping}=I_R$). Thus, the negative input of the operational amplifier is virtually connected to the same potential as the positive input. The current $I_R$ thus causes a voltage drop at resistor R. This voltage is also present at the output of the operational amplifier.

$$U_A = I_{Tapping} * R \quad (4)$$

From this one may derive:

$$U_A = U_{Bias} * R * dC/dt \quad (5)$$

Further processing of the measuring signals is performed analogously to the method described in FIG. 1.

In the method of the present invention the change in capacitance during the scanning motion of the probe along the surface of the sample is measured and evaluated directly as a current. The capacitance conditions change during the measurement, so that as a result of the vertical tapping motion of the tip and the attendant shift of the tip of the probe with respect to the substrate, a shift current is generated that varies both periodically and laterally (i.e. during scanning), and which can be measured.

The features of the present invention disclosed in the above description, the drawings and the claims can have significance for the practice of the invention in its various embodiments both individually and in any combination thereof. The present invention is not limited by the above embodiments. Rather, a number of variants and modifications are conceivable that utilize the idea according to the invention and thus also fall under the scope of the invention.

What is claimed is:

1. A method for two-dimensional profiling of doping profiles of a material sample with a scanning capacitance microscope, comprising the steps of:
   selecting a fixed bias voltage $U_{Bias}$ between a tip of a probe and a sample,
   scanning a two-dimensional structure of a dielectric or partially dielectric material sample with a tip of a probe of the scanning capacitance microscope,
   measuring a change in capacitance with respect to time (dC/dt) during the scanning motion of the probe from one position on the material sample to the next; and
   evaluating the change in capacitance during the scanning motion of the probe from the one position on the material sample to the next as a current.

2. The method as claimed in claim 1 wherein the fixed bias voltage at the tip of the probe drops off with respect to the dielectric or partially dielectric material sample.

3. The method as claimed in claim 1 wherein the current is amplified using a current amplifier configured as an operational amplifier.

4. The method as claimed in claim 3 wherein the operational amplifier serves as a voltage-current converter and the scanning capacitance as a derivative element.

5. The method as claimed in claim 3 wherein voltage drops between the output of the operational amplifier and a reference potential are evaluated using at least one lock-in amplifier.

6. The method as claimed in claim 5 wherein higher harmonics of a base voltage are evaluated using respective individual lock-in amplifiers.

7. The method as claimed in claim 5 wherein higher harmonics of the base voltage are individually evaluated in a predefined sequence using lock-in amplifiers.

8. The method as claimed in claim 5 wherein the lock-in amplifiers are configured as two-phase lock-in amplifiers.

9. The method as recited in claim 3 wherein voltage drops between the output of the operational amplifier and a reference potential are evaluated using at least one circuit providing lock-in amplification.

10. The method as claimed in claim 1 wherein a metallic or metallized tip of a probe of a scanning microscope is used as a component of the capacitance to be measured.

11. The method as claimed in claim 10 wherein the metallic or metallized tip of a probe of a scanning microscope is coated with an additional dielectric layer.

12. An apparatus for two-dimensional profiling of doping profiles of a material sample, comprising:
    a scanning capacitance microscope having a tip of a probe for scanning a two-dimensional structure of a dielectric or partially dielectric material sample;
    a fixed bias voltage $U_{Bias}$ is selected between the tip and the sample;
    a current amplifier configured as an operational amplifier for evaluating a change in capacitance with respect to time (dC/dt) during the scanning motion of the probe from one position on the material sample to the next as a current; and
    at least one lock-in amplifier for evaluating voltage drops between the output of the operational amplifier and a reference potential.

13. The apparatus as defined in claim 12 wherein the operational amplifier serves as a voltage-current converter and the scanning capacitance as a derivative element.

14. The apparatus as defined in claim 12 wherein higher harmonics of a base voltage are evaluated using respective individual lock-in amplifiers of the at least one lock-in amplifier.

15. The apparatus as defined in claim 14 wherein higher harmonics of the base voltage are individually evaluated in a predefined sequence by means of lock-in amplifiers.

16. The apparatus as defined in claim 12 wherein the at least one lock-in amplifiers are configured as two-phase lock-in amplifiers.

17. The apparatus as defined in claim 12 wherein a metallic or metallized tip of the probe of the scanning microscope is used as a component of the capacitance to be measured.

18. The apparatus as defined in claim 17 wherein the metallic or metallized tip of the probe of the scanning microscope is coated with an additional dielectric layer.

19. An apparatus for two-dimensional profiling of doping profiles of a material sample, comprising:
    a scanning capacitance microscope having a tip of a probe for scanning a two-dimensional structure of a dielectric or partially dielectric material sample;
    a fixed bias voltage $U_{Bias}$ is selected between the tip and the sample;

a current amplifier configured as an operational amplifier for evaluating a change in capacitance with respect to time (dC/dt) during the scanning motion of the probe from one position on the material sample to the next as a current; and at least one circuit providing lock-in amplification for evaluating voltage drops between the output of the operational amplifier and a reference potential.

* * * * *